UNITED STATES PATENT OFFICE.

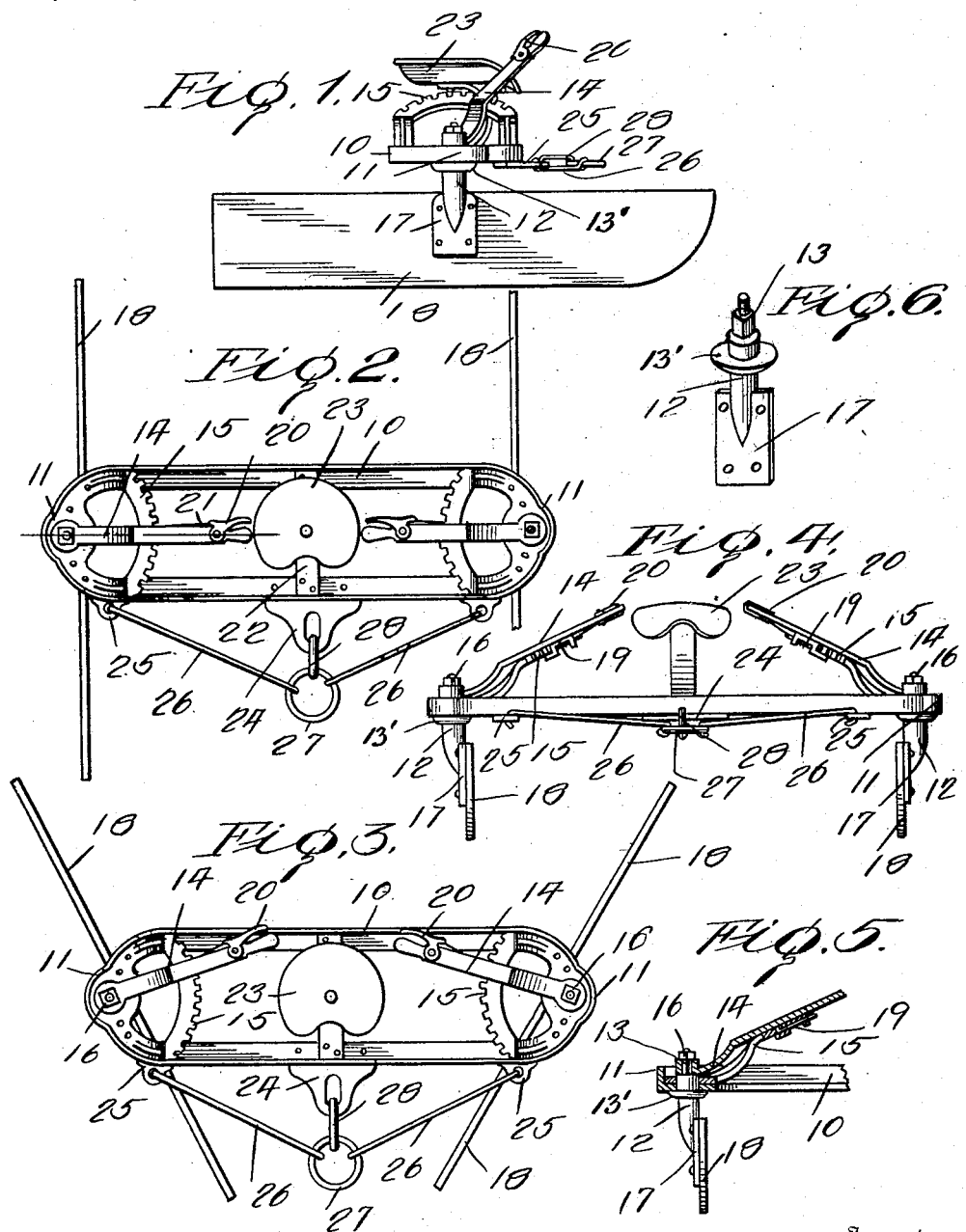

STANLEY ASHCRAFT, OF WELLINGTON, KANSAS.

ROAD-SCRAPER.

1,205,502.  Specification of Letters Patent.  Patented Nov. 21, 1916.

Application filed July 9, 1915. Serial No. 38,996.

*To all whom it may concern:*

Be it known that I, STANLEY ASHCRAFT, a citizen of the United States, residing at Wellington, in the county of Sumner, State of Kansas, have invented certain new and useful Improvements in Road-Scrapers; and I do hereby declare the following to be a full, clear, and exact description of the invention, such as will enable others skilled in the art to which it appertains to make and use the same.

This invention relates to improvements in road scrapers.

One object of the invention is to provide a simple and novel device of this character in which the scraping blades can be quickly and easily shifted singly or simultaneously to change their angle with respect to their line of movement.

Another object is to provide a device of this character including a pair of scraping blades which can be swung to converge toward each other at the front or rear at any angle desired.

Other objects and advantages will be apparent from the following description when taken in connection with the accompanying drawing.

In the drawing: Figure 1 is a side elevation of a scraper made in accordance with my invention, Fig. 2 is a top plan view, showing the blades in parallel relation, Fig. 3 is a top plan view showing the blades swung to converge at their forward ends, Fig. 4 is a front elevation of the device, Fig. 5 is a transverse section on the line 5—5 of Fig. 2, and Fig. 6 is a perspective view of the blade holding shaft.

Referring particularly to the accompanying drawing, 10 represents a horizontal frame which is approximately rectangular in outline, the ends of which project longitudinally as shown at 11. Vertical stub-shafts 12 extend upwardly through openings in these portions 11 and have their upper ends square in cross section as shown at 13, to receive thereon the handles 14. Each of these stub shafts is formed with a bearing flange 13' designed to support the frame 10 when they have been arranged in operative position. Secured to each end of the frame in positions to be traversed by these handles are the toothed segments 15. Clamping nuts 16 secure these handles to the upper ends of the stub shafts. Carried by the lower ends of these stub shafts are the flattened plate like portions 17 which are centrally secured to the outer faces of the vertically standing and longitudinally extending scraper blades 18. Each of the handles carries a spring-pressed plunger pawl 19 which is adapted to engage with the teeth of the segment and is arranged to be released therefrom by means of the hand grip 20 connected thereto by the rod 21. A bar 22 extends between the longer sides of the frame 10 at the intermediate portion thereof, and carries a seat 23 for the driver. Forwardly of the seat, and in the center of the frame is a forwardly extending loop or eye 24, while eyes 25 are carried adjacent the ends of the forward side of the frame. Connected to these eyes 25 are the forwardly converging links 26 which are connected to a ring 27 carrying a link 28 which connects with the before-mentioned eye 24.

It will thus be seen that by means of the handles 14 the blades 18 can be swung into parallel relation or their forward or rear ends swung into converging relation. Also, either of the blades can remain in a longitudinally extending position while the other blade can be swung so that either its forward or rear end extends toward the first blade at an angle.

What is claimed is:

A road scraper comprising an elongated frame having an operator's seat mounted thereon, draft means carried by the frame, vertical stub shafts mounted in the ends of the frame, a bearing flange formed on each of the stub shafts to support the frame, vertically disposed elongated scraper blades secured to the lower ends of the stub shafts, toothed segments carried by the ends of the frame, and operating ratchet handles secured to the upper ends of the stub shafts and engageable with the segments, said handles extending to points adjacent the operator's seat, whereby the blades can be readily adjusted either singly or together to different forwardly or rearwardly converging positions.

In testimony whereof, I affix my signature, in the presence of two witnesses.

STANLEY ASHCRAFT.

Witnesses:
 WALTER STUBBS,
 L. P. JETER.

Copies of this patent may be obtained for five cents each, by addressing the "Commissioner of Patents, Washington, D. C."